Jan. 24, 1956  E. S. SMITH  2,732,476
COMPENSATED THERMOSTATIC CONTROL FOR ELECTRIC RANGES
Filed June 30, 1951  2 Sheets-Sheet 1

Inventor
E. S. SMITH
By- Maybee + Leglis
Att'ys

Jan. 24, 1956   E. S. SMITH   2,732,476
COMPENSATED THERMOSTATIC CONTROL FOR ELECTRIC RANGES
Filed June 30, 1951   2 Sheets-Sheet 2

Inventor
E. S. SMITH
By~ Maybee & Legris
Att'ys

United States Patent Office 2,732,476
Patented Jan. 24, 1956

2,732,476
COMPENSATED THERMOSTATIC CONTROL FOR ELECTRIC RANGES

Elmore Stanley Smith, North York Township, York County, Ontario, Canada, assignor to Moffats Limited, Weston, Ontario, Canada, a corporation Application June 30, 1951, Serial No. 234,498

6 Claims. (Cl. 219—20)

This invention relates to thermostatic controls for electric ranges and more particularly to a compensator for reducing time lag in thermostatic controls of the kind described.

The oven in a modern electric range is usually provided with two heating elements, namely a lower heating element which is the more frequently used of the two, primarily for baking, and an upper heating element which is used primarily for broiling or for grilling. A thermostatic control is provided to regulate the supply of power to the elements to hold the oven at a desired predetermined temperature, and the control is normally so designed that by the adjustment of a single lever or dial the power may be switched on to either element and the control may be set to keep the oven at a predetermined temperature. In addition, thermostatic controls of this type also enable both elements to be energized simultaneously for rapid pre-heating of a cold oven to the desired temperature, and after the said temperature has been reached the upper or grill element is automatically disconnected from the power supply and thenceforth the oven is maintained at the desired temperature by the bake or lower element only. Controls of this kind are disclosed in my Patent No. 2,487,037, dated November 1, 1949, and assigned to Moffats Limited.

It is axiomatic that to transfer heat from an oven to the thermostat of a thermostatic control, the ambient temperature in the oven must necessarily be slightly higher than the temperature of the thermostat. When an oven has been used continuously for say one half hour at a nominally constant temperature, the thermostatic control intermittently connects and disconnects the power supply to the bake element to maintain the oven at the said nominally constant temperature; since the temperature variations in the oven are only slight, there may be no appreciable time lag in the operation of the thermostat. It has been found however that when pre-heating a cold oven by energizing both the upper and lower elements and thus changing the ambient temperature of the oven rapidly, there is an appreciable time lag in the operation of the thermostatic control. As a matter of fact, the ambient temperature in the oven may overshoot the desired temperature by as much as 100° F. However after the oven has cooled to the temperature for which the control has been preset, the oven will thenceforth be maintained at substantially the desired temperature.

It is therefore an object of this invention to incorporate, in a thermostatic control of the kind which permits rapid pre-heating of a cold oven by the energization of an extra element which is disconnected after the oven has been heated to the predetermined temperature, means whereby the time lag of the thermostat is minimized when the control is set to pre-heat the oven, without affecting the accurate operation of the control when the oven is in use under normal conditions.

Briefly, this object is achieved by providing in close proximity to the thermostat of the control an auxiliary or secondary heater which is energized when the control is set to pre-heat the oven and which thereby radiates an additional amount of heat to the thermostat, so that the thermostat responds and disconnects the power supply from the upper element sooner than it would if it were subject to only the oven heat; furthermore, this auxiliary heater is so connected in the control circuit that after the oven has been heated to the desired temperature the auxiliary heater is automatically disconnected at the same time as the upper element is disconnected, and it stays out of the circuit until the next time the user sets the control for rapid pre-heating of the cold oven. If a smaller amount of compensation for the thermostat is required after the pre-heating stage, the auxiliary heating element may be connected to have a reduced heating effect during the period that the oven temperature is maintained substantially constant.

Other objects and advantages of this invention will become apparent from a study of the following description, taken in conjunction with the accompanying drawings, in which several embodiments of the invention are illustrated, and in which.

Figure 3:
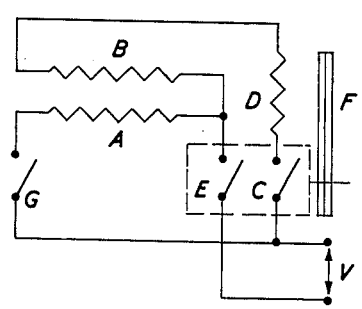
Figure 4:
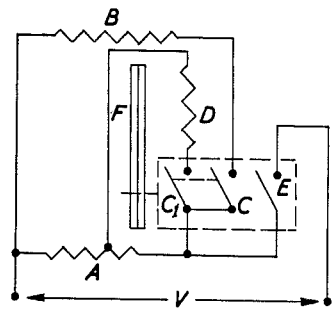
Figure 5:
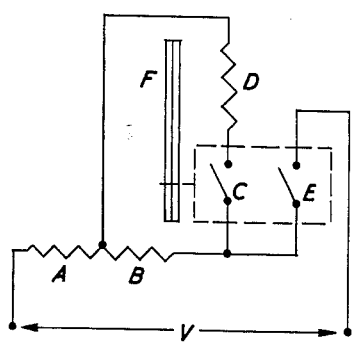
Figure 6:
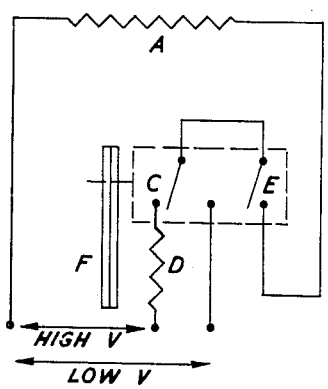
Figure 7:
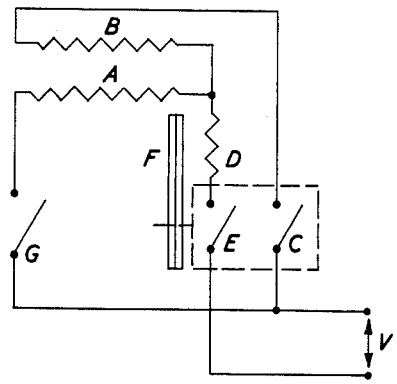
Figure 8:
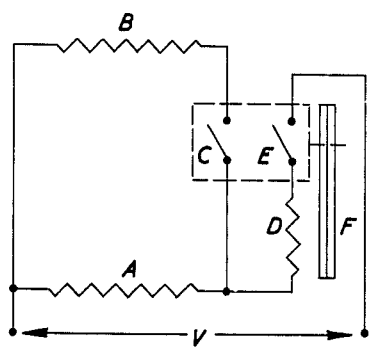

Fig. 3 is a circuit diagram for the so-called "simple" control disclosed in my aforesaid U. S. Patent No. 2,487,037, illustrating particularly how one embodiment of this invention may be incorporated in one of the controls disclosed in the said patent;

Figs. 4, 5 and 6 are circuit diagrams of alternative forms of this invention;

Fig. 7 is a circuit diagram for the "simple" control of the aforesaid U. S. patent illustrating another embodiment of this invention; and Fig. 8 is a circuit diagram of another embodiment of this invention.

Figure 1:
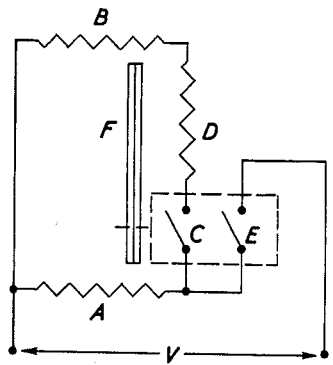
Fig. 1 is a circuit diagram of a thermostatically controlled system constructed in accordance with this invention, with the auxiliary heater in series with the upper heating element.

Referring to Fig. 1, a primary heating element A is the usual lower or bake element in an oven and a primary heating element B is the usual upper or grill element. Both primary elements are connected at one end to one of the terminals V of a source of power. At its other end, the element A may be connected to the other end of the element B through a switch C and a secondary or auxiliary heating element D. The said other end of the element A may also be connected to a second terminal V of the source of power through a switch E. A thermostat F is responsive to the oven temperature, and receives additional heat from the element D when that element is energized. To pre-heat the oven, the switches C and E are closed manually, and current flows through the primary elements A and B and the secondary element D. Although the oven heats rapidly, the auxiliary element D compensates for the thermal lag in the thermostat F. Therefore the thermostat gives a substantially true indication of the ambient temperature of the oven, and when a predetermined oven temperature is reached the thermostat opens the switches C and E, thereby disconnecting all the heating elements. Thereafter the oven temperature is maintained at the desired value by the thermostat intermittently closing and opening the switch E to intermittently energize the element A in the usual way. The switch C remains open until it is re-closed manually, and therefore the secondary element D influences the thermostat only when the control is manually set for rapid preheating of the oven. In Fig. 1, and in the other figures, the dashed lines extending from the thermostat F and encompassing the switches C and E are provided to indicate that the switches C and E are operated by the thermostat F.

As long as the secondary heating element D can be permanently disconnected or short-circuited after the pre-heating of the oven is complete, the element D may be connected in series or parallel with any part of the circuit. A few of the many possible alternative circuit connections will now be described.

Figure 2:
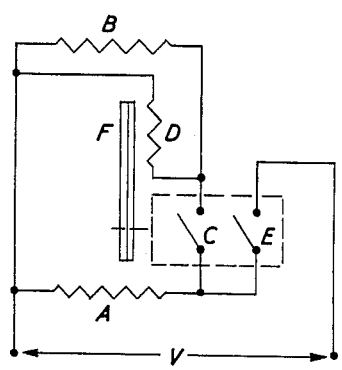
Fig. 2 is a circuit diagram of a thermostatic control constructed in accordance with this invention, with the auxiliary heater in parallel with the upper heating element.

The circuit in Fig. 2 is the same as that in Fig. 1 except that the secondary heating element D is connected in parallel with the primary element B. When the switch C is opened by the thermostat F at the end of the pre-heating stage, the heating elements B and D are permanently disconnected.

In Fig. 3, a primary heating element A may be connected through an additional switch G to a power terminal V and the other end of the element A may be connected through a switch E to a second power terminal V. The first-mentioned power terminal may be connected through a switch C, a secondary heating element D, and a primary heating element B to the said other end of the element A. For pre-heating the oven, the switches G, E and C are closed manually and the elements A, B and D are thereby energized. When a predetermined temperature is reached, a thermostat F disconnects the elements B and D by opening the switch C, and thereafter keeps the oven at the desired temperature by intermittently closing and opening the switch E, the switch G being permanently closed. The advantage of having the additional switch G is that it may be opened to disconnect the element A when it is desired to use the upper element B alone, as for broiling.

A description of a so-called "simple" control for opening and closing the switches G, E and C will be found in my aforesaid Patent No. 2,487,037, beginning at column 6, line 41 and ending at column 8, line 15, the switches in that patent being designated A, B and C respectively. Briefly, the switch designated E in the present specification is a snap switch of the type which automatically closes unless it is biased open by means of the thermostat, whereas the switch designated C in the present specification is a snap switch of the type which remains in whatever position, open or closed, to which it is pushed. Both switches having been closed manually at the beginning of the pre-heating stage, at the end of the pre-heating stage the thermostat moves to a position where it forces the switches E and C to the open position. As the thermostat cools, it permits the switch E to re-close itself, but the switch C does not re-close itself and therefore remains open until closed manually.

Thus, the thermostatic control shown in Fig. 7 of my prior Patent No. 2,487,037 may be used without modification to operate switches G, E and C of the present specification, such switches being identical with switches A, B and C respectively of the prior patent.

In Fig. 4, a primary element A is connected at one end to a primary element B and a power terminal V, and may be connected at its other end through a switch C to the element B and through a switch E to another power terminal V. A secondary heating element D may be connected in parallel with a portion of the element A by means of a switch C'. The switches C and C' operate together. For pre-heating, the switches E, C and C' are closed manually, and at the end of the pre-heating stage a thermostat F opens the switches C and C', thereby permanently disconnecting the elements B and D. The element A is thereafter intermittently energized through the switch E.

In Fig. 5, a pair of primary heaters A and B may be connected in series through a switch E to terminals V. The element B may be substantially short-circuited through a switch C and a secondary heating element D. To pre-heat the oven, the switches C and E are closed manually so that the element B is substantially short-circuited and the elements A and D are energized. At the end of the pre-heating stage, the switch C is opened, and thereafter the elements A and B are intermittently energized through the switch E. The operation of this circuit is easily understood when it is remembered that in a circuit having a series resistance R to which a voltage V is applied, the heat developed is proportional to $$\frac{V^2}{R}$$

For a given voltage, less heat is developed if R is increased; in the circuit shown in Fig. 5, R is equal to the resistance of the element A during the pre-heating stage, but is increased thereafter to the resistance of the element A plus the resistance of the element B. The elements A and B may therefore be regarded as comprising a single variable resistance element.

In fact, in all the circuits described so far, an initial high heat output is reduced to a low heat output by increasing the equivalent series resistance of the circuit. In Fig. 1, for example, the elements A and B when connected in parallel have a smaller equivalent series resistance than has the element A when connected alone. The primary elements may therefore be regarded as comprising a single adjustable heating element; the important feature according to this invention is the provision of a secondary element to compensate for thermal lag in the thermostat during the time that the heat output is high.

Fig. 6 shows a circuit in which a variable voltage may be applied to a primary heating element A, a high voltage being applied during the pre-heating stage and a lower voltage thereafter. A variable voltage can be applied in many ways, but in the simple circuit illustrated, a primary heating element A is connected at one end to one power terminal V and at the other end through a switch E to a switch C. The switch C can be connected to either a high voltage line, for pre-heating, or to a low voltage line. A secondary element D is connected in the high voltage line, and is therefore energized during the pre-heating stage and disconnected at the end of the pre-heating stage when the switch C is moved by a thermostat F to the low voltage line. Thereafter, the switch E is intermittently opened and closed by the thermostat to hold the oven at the desired temperature.

The circuit shown in Fig. 7 is the same as that in Fig. 3, except that the secondary element D is connected between the switch E and the primary elements A and B rather than between the switch D and the primary element B. During the pre-heating stage, the switches G, E and C are closed and the elements A, B and D are all energized. At the end of the pre-heating stage, the thermostat F opens the switches C and E, and the switch E is thereafter intermittently closed and opened by the thermostat to maintain the desired oven temperature. It will be seen that the secondary element D is energized each time the switch E is closed, and that the secondary element is therefore used during both the pre-heating stage and the subsequent baking stage. If the current supplied to the lower element A and the element D when energized during the baking stage is equal to one-half of the current flowing to all the elements during the pre-heating stage, then the element D when energized during the baking stage will have approximately one-quarter of the heating effect that it had during the pre-heating stage. Consequently the secondary element D not only compensates the thermostat for thermal lag during the pre-heating stage but also provides reduced compensation for the thermostat during the baking stage while the oven temperature remains fairly constant.

The circuit shown in Fig. 8 is the same as that shown in Fig. 1 save for the fact that the secondary element D is connected to carry the total current flowing to both the primary elements rather than just the current flowing to the upper primary element B. Again, it will be seen that the secondary element provides compensation for the thermal lag of the thermostat during the pre-heating stage and reduced compensation during the baking stage. Similar modifications may be made in the other circuits illustrated.

It is thought that the construction and use of this invention will be apparent from the above description of the various parts and their purposes. It is to be understood that the forms of this invention herewith shown and described are to be taken as preferred examples of the same, and that various changes may be resorted to without departing from the spirit of this invention or the scope of the subjoined claims.

What I claim as my invention is:

1. A range oven comprising primary heating means for heating the oven and connectible to provide a high heat output when initially energized and a lower heat output when subsequently energized, a thermostat located where it is responsive to the heat output of the primary heating means, auxiliary heating means located adjacent the thermostat for supplying additional heat to the thermostat, first connecting means initially connecting in circuit the primary heating means and the auxiliary heating means, the primary heating means being connected by the first connecting means to provide the high heat output when said circuit is energized, the auxiliary heating means when energized in said circuit being of sufficient heating capacity to minimize time lag between the temperature of the oven and that of the thermostat, the first connecting means being actuated by the thermostat when the oven has reached a predetermined temperature to alter said circuit to reduce the heat outputs of the primary and auxiliary heating means when the circuit is energized thereafter, and second connecting means actuated by the thermostat to energize and de-energize said altered circuit.

2. A range oven comprising primary heating means for heating the oven and connectible to provide a high heat output when initially energized and a lower heat output when subsequently energized, a thermostat located where it is responsive to the heat output of the primary heating means, auxiliary heating means located adjacent the thermostat for supplying additional heat to the thermostat, first connecting means initially connecting in circuit the primary heating means and the auxiliary heating means, the primary heating means being connected by the first connecting means to provide the high heat output when said circuit is energized, the auxiliary heating means when energized in said circuit being of sufficient heating capacity to minimize time lag between the temperature of the oven and that of the thermostat, second connecting means for energizing said circuit, the second connecting means being actuated by the thermostat to de-energize said circuit when the oven has reached a predetermined temperature and the first connecting means also being actuated by the thermostat when said temperature has been reached to alter said circuit and thereby reduce the heat outputs of the primary and auxiliary heating means when said altered circuit is energized, the second connecting means being actuated by the thermostat to energize and de-energize said altered circuit to maintain the temperature of the oven substantially constant.

3. A range oven comprising primary heating means for heating the oven and variable to provide a high heat output when initially energized and a lower heat output when subsequently energized, a thermostat located where it is responsive to the heat output of the primary heating means, auxiliary heating means located adjacent the thermostat for supplying additional heat to the thermostat, first connecting means initially connecting in circuit the primary heating means and the auxiliary heating means to provide the high heat output when energized, the auxiliary heating means being of sufficient heating capacity to minimize time lag between the temperature of the oven and that of the thermostat, the first connecting means being actuated by the thermostat when the oven has reached a predetermined temperature to render the auxiliary heating means inoperative thereafter and to vary the primary heating means and thereby reduce its heat output when it is energized thereafter, and second connecting means actuated by the thermostat to energize and de-energize the varied primary heating means to maintain the temperature of the oven substantially constant.

4. An electric range oven comprising a resistive heating circuit of variable resistance for providing a high heat output to the heating oven when initially energized and a lower heat output when subsequently energized, a thermostat located where it is responsive to the heat output of the heating circuit, auxiliary resistive heating means located adjacent the thermostat for supplying additional heat to the thermostat, first connecting means for initially setting the resistance of said circuit at a low value to provide the high heat output when energized and connecting the auxiliary heating means in said circuit, the auxiliary heating means being of sufficient heating capacity to minimize time lag between the temperature of the oven and that of the thermostat, the first connecting means being actuated by the thermostat when the oven has reached a predetermined temperature to disconnect the auxiliary heating means from the circuit and increase the resistance of the circuit, the circuit thus providing the lower heat output when energized thereafter, and second connecting means actuated by the thermostat to energize and de-energize the circuit of increased resistance to maintain the temperature of the oven substantially constant.

5. A range oven comprising a pair of primary heating elements for heating the oven, a thermostat located where it is responsive to the heat output of the primary heating elements, an auxiliary heating element located adjacent the thermostat for supplying additional heat to the thermostat, first connecting means initially connecting in circuit all the said heating elements to provide a high heat output from the primary heating elements when energized, the auxiliary heating element being of sufficient heating capacity to minimize time lag between the temperature of the oven and that of the thermostat, the first connecting means being actuated by the thermostat when the oven has reached a predetermined temperature to render the secondary heating element and one of the primary heating elements inoperative thereafter whereby the other primary heating element when energized thereafter has a lower heat output than the pair of primary elements had initially, and second connecting means actuated by the thermostat to energize and de-energize said other primary heating element thereafter to maintain the temperature of the oven substantially constant.

6. A range oven comprising a pair of primary electric heating elements for heating the oven, a thermostat located where it is responsive to the temperature of the oven, an auxiliary electric heating element located adjacent the thermostat for supplying additional heat to the thermostat and connected in series with one of the primary elements, a first switch initially closed to connect the said series connected elements in parallel with the other primary element, and a second switch initially closed to energize all the said elements, the auxiliary element being of sufficient heating capacity when energized to minimize time lag between the temperature of the apparatus and that of the thermostat, the first switch being permanently opened by the thermostat and the second switch also being opened by the thermostat when the oven has reached a predetermined temperature, and the second switch being closed and opened thereafter in succession by the thermostat to energize and de-energize the said other primary element to maintain the temperature of the oven substantially constant.

(References on following page)

References Cited in the file of this patent

UNITED STATES PATENTS

| | | |
|---|---|---|
| 1,822,191 | Appelberg | Sept. 8, 1931 |
| 2,122,650 | Keene | July 5, 1938 |
| 2,207,634 | Myers et al. | July 9, 1940 |
| 2,210,947 | Myers et al. | Aug. 13, 1940 |
| 2,213,993 | Myers | Sept. 10, 1940 |
| 2,409,414 | Bletz | Oct. 15, 1946 |
| 2,434,467 | McCormick | Jan. 13, 1948 |
| 2,435,530 | Candor | Feb. 3, 1948 |
| 2,486,443 | Smith | Nov. 1, 1949 |
| 2,487,037 | Smith | Nov. 1, 1949 |
| 2,498,127 | Kuhn | Feb. 21, 1950 |
| 2,649,530 | Dietz | Aug. 18, 1953 |